June 14, 1949.  A. W. RAMSTAD  2,473,301
MOTION-PICTURE SCREEN
Filed Sept. 5, 1946  2 Sheets-Sheet 1
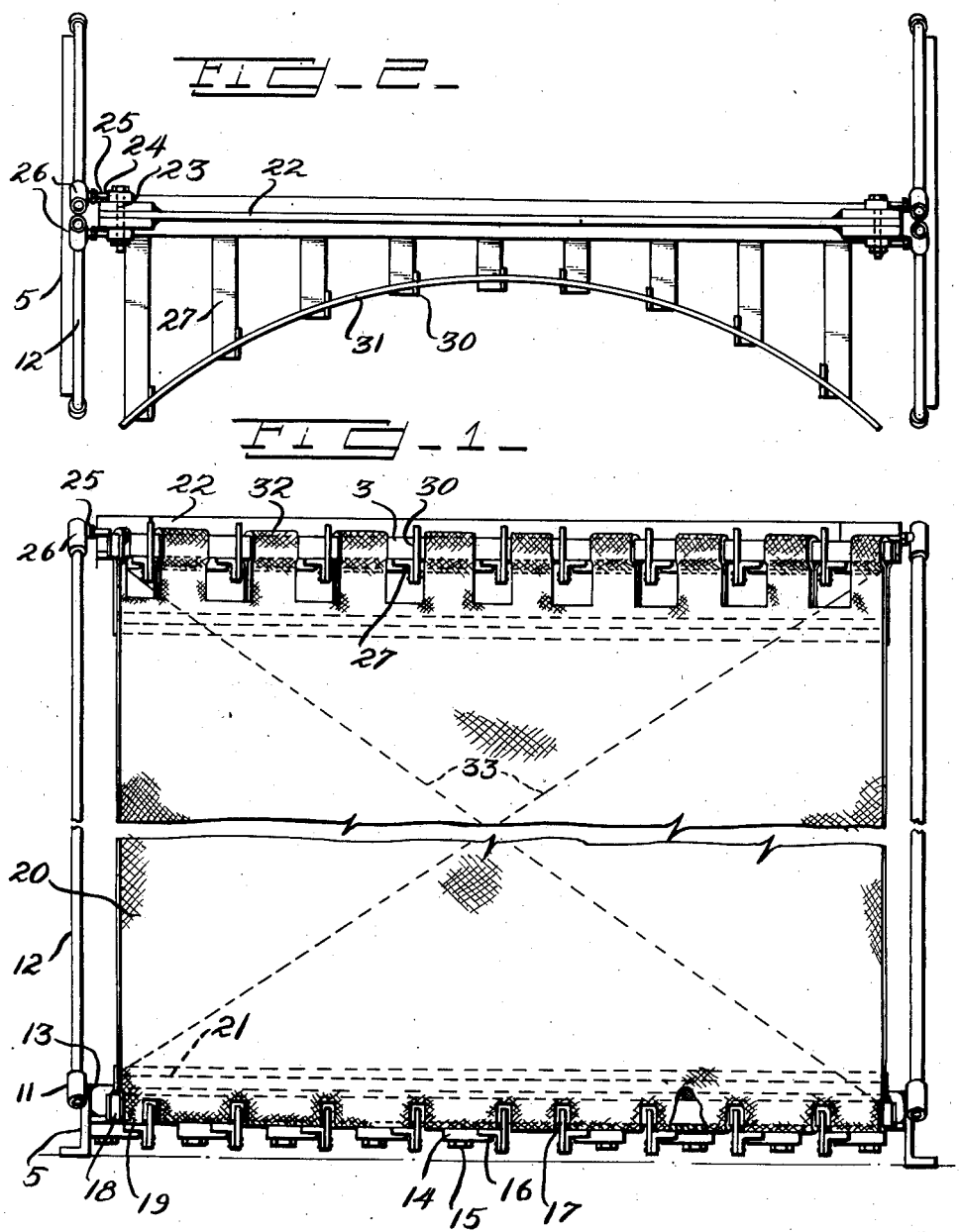
Inventor
Anders W. Ramstad-
By Clarence A. O'Brien
and Harvey B. Jackson
Attorneys June 14, 1949.  A. W. RAMSTAD  2,473,301
MOTION-PICTURE SCREEN
Filed Sept. 5, 1946   2 Sheets-Sheet 2
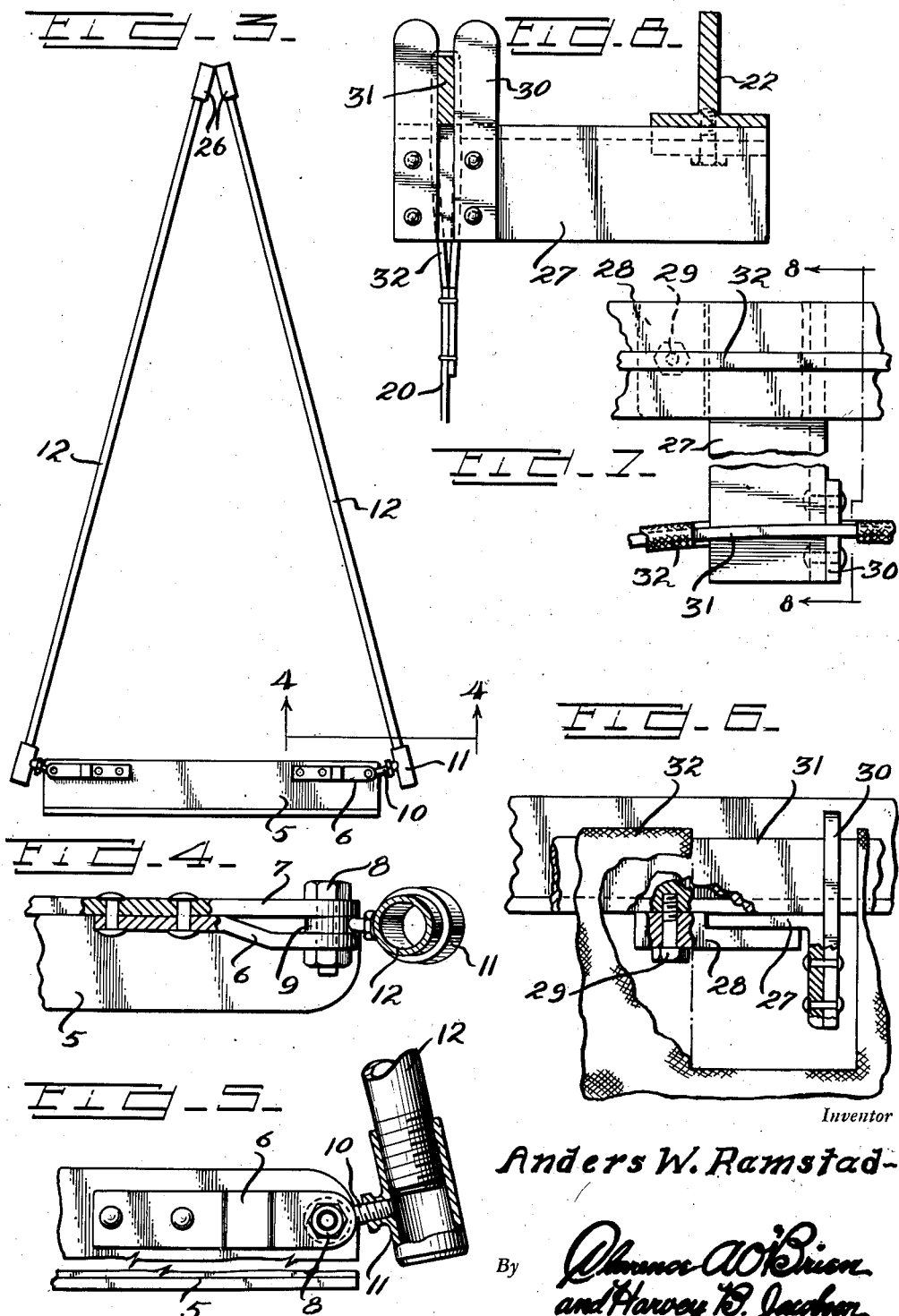
Inventor
Anders W. Ramstad-
By
*Attorneys*

Patented June 14, 1949

2,473,301

UNITED STATES PATENT OFFICE 2,473,301

MOTION-PICTURE SCREEN

Anders W. Ramstad, Parkland, Wash.

Application September 5, 1946, Serial No. 694,909

2 Claims. (Cl. 88—28.90)

The present invention relates to new and useful improvements in screens for the projection of pictures, such as still pictures, silent motion pictures or talking motion pictures by means of a conventional form of projection.

It is well known that pictures projected on a flat screen and illuminated by a beam of light appear distorted when viewed from a too close range or from the sides of the screen, and that such distortion may be cured by properly curving the screen from side to side.

An important object of the present invention is to provide a screen for projection pictures with means for properly curving the screen so that distortion of the picture projected on it is eliminated when said pictures are viewed from either side and close range.

A further object of the invention is to provide a supporting frame for the screen adjustable at its top and bottom edges at closely spaced points along said edges to curve the screen variably in accordance with projection requirements.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view;

Figure 2 is a top plan view;

Figure 3 is a side elevational view of the standard for supporting the upper edge of the screen;

Figure 4 is a fragmentary sectional view taken on a line 4—4 of Figure 3 and the parts broken away and shown in section;

Figure 5 is an enlarged fragmentary side elevational view of the adjustable socket for the lower ends of the standards;

Figure 6 is an enlarged front elevational view of one of the adjustable supporting arms for the screen and its parts broken away and shown in section;

Figure 7 is a top plan view thereof; and

Figure 8 is a sectional view taken on a line 8—8 of Figure 7.

Referring now to the drawings in detail wherein for the purpose of illustration I have disclosed a preferred embodiment of the invention the numeral 5 designates a pair of side base members of angle iron construction adjacent the front and rear edges of which are secured plates 6 spaced at one side of the vertical flange 7 of the base and through which a bolt or nut 8 is inserted for clamping a ring or eye 9 therebetween, the ring being pivotally mounted on the bolt. A threaded stud 10 projects radially from the ring 9 and is threaded through one side of a socket 11 in which the lower end of a standard 12 is threaded, each of the side base members 5 being provided with one of the standards 12 at the front and rear ends thereof as will be apparent from inspection of Figure 3 of the drawings.

A lower inverted T-shaped member 13 has its ends welded or otherwise suitably secured to the central portion of the side base members 5 in a position above the lower edges of said base members.

A plurality of clamping plates 14 are secured to the underside of the lower frame member 13 by means of bolts 15 for clamping angle iron arms 16 to the underside of said lower frame members, the arms 16 being adjustable by the clamping plates 14 forwardly and rearwardly of the lower frame member 13. A pair of gripping prongs 17 are secured in spaced apart upstanding position to the front end of each arm 16 and between which a resilient metal strip 18 is positioned, the strip thus being gripped in a manner presently seen between the prongs 17 forwardly of the lower frame member 13 and between the side base members 5.

The strip 18 is inserted through loops 19 formed at the lower edge of a screen 20 constructed of suitable material used for motion picture screens, the loops being formed as an interrupted hem by folding the material upon itself and stitching the same as indicated at 21.

An upper inverted T-shaped frame member is shown at 22 having bolts 23 inserted through the end portions thereof and on which rings and studs 24 and 25 respectively are adjustably secured, the studs being threaded into the sides of sockets 26 mounted on the upper end of the standards 12.

Forwardly projecting angle iron arms 27, like the arms 16, are also secured to the underside of the upper frame member 22 by means of clamping plates 28 and bolts 29 for securing the arms 27 in an adjusted position forwardly of the frame member 22. The front ends of the arms 27 are also each provided with a pair of spaced apart upstanding gripping prongs 30, like the prongs 17, and between which an upper flexible metal strip 31 is gripped as presently seen, the strip 31 being inserted through loops 32 at the upper end of the screen 20. Crossed wire braces 33 extend from the corners of the screen behind the latter to provide braces therefor.

The base members 5 provide a rigid support for the lower frame member 13 and the standards 12 provide an adjustable and collapsible support for the upper frame member 22 by reason of the threaded engagement of the standards in the upper and lower sockets 26 and 11 to stretch the fabric screen 20.

The curvature of the screen may be regulated by sliding the upper and lower arms 27 and 16 forwardly or rearwardly under the frame members 13 and 22 to curve the strips 18, 31 and correspondingly curve the screen 20 from side to side thereof to compensate for variations in the distance of the projector from the screen. Curving the strips 18, 31 between the pairs of prongs 17, 30 causes said pairs of prongs to frictionally grip said strips so as to hold said strips between the pairs of prongs and maintain the screen 20 smooth.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended within the scope of the appended claims.

Having described my invention, what is claimed as new is:

1. A picture projection screen structure comprising upper and lower horizontal frame members, upper and lower curved resilient strips extending horizontally, a flexible screen having upper and lower edges attached to said strips whereby said screen is curved from side to side thereof by said strips, and means for supporting said strips comprising a plurality of arms independently adjustable endwise on said frame members to apply pressure to said strips at different points along the same to variably curve said strips and said screen.

2. A picture projection screen structure comprising upper and lower horizontal frame members, upper and lower curved resilient strips extending horizontally, a flexible screen having upper and lower edges attached to said strips whereby said screen is curved from side to side thereof by said strips, arms on said frame members independently adjustable endwise, and pairs of prongs on said arms straddling said strips at different points along the same whereby said strips are adapted to be variably curved by independent adjustment of said arms and to variably curve said screen.

ANDERS W. RAMSTAD.

REFERENCES CITED

The following references are of record in the file of this patent:

UNITED STATES PATENTS

| Number | Name | Date |
|---|---|---|
| 1,330,447 | Pech | Feb. 10, 1920 |
| 1,613,933 | Castleton | Jan. 11, 1927 |
| 2,060,817 | Mahoney | Nov. 17, 1936 |

FOREIGN PATENTS

| Number | Country | Date |
|---|---|---|
| 182,311 | Great Britain | July 6, 1922 |